US012659040B2

(12) United States Patent
Rhody et al.

(10) Patent No.: US 12,659,040 B2
(45) **Date of Patent: *Jun. 16, 2026**

(54) OPTICAL DELAY COMPENSATION IN OPTICAL MODULES

(71) Applicant: Ciena Corporation, Hanover, MD (US)

(72) Inventors: Benard J. Rhody, Ottawa (CA); Eric S. Maniloff, Woodlawn (CA); Will Leckie, Ottawa (CA); Bernard Thiboutot, Gatineau (CA)

(73) Assignee: Ciena Corporation, Hanover, MD (US)

( * ) Notice: Subject to any disclaimer, the term of this patent is extended or adjusted under 35 U.S.C. 154(b) by 280 days.

This patent is subject to a terminal disclaimer.

(21) Appl. No.: 18/520,840

(22) Filed: Nov. 28, 2023

(65) Prior Publication Data

US 2025/0175254 A1      May 29, 2025

(51) Int. Cl.
*H04B 10/40*          (2013.01)
*H04B 10/079*         (2013.01)

(52) U.S. Cl.
CPC ......... *H04B 10/40* (2013.01); *H04B 10/0795* (2013.01)

(58) Field of Classification Search
CPC ............................ H04B 10/40; H04B 10/0795
USPC .......................................................... 398/25
See application file for complete search history.

(56) References Cited

U.S. PATENT DOCUMENTS 7,835,278 B2 * 11/2010 Hesse ..................... H04L 47/56
                                                    370/392
8,699,880 B2    4/2014 Grigoryan

| | | | |
|---|---|---|---|
| 9,515,767 B2 | 12/2016 | Frankel et al. | |
| 10,396,891 B2 | 8/2019 | Maniloff et al. | |
| 10,439,726 B1 | 10/2019 | Mazzini et al. | |
| 11,153,009 B1 * | 10/2021 | Parker .............. | H04B 10/07957 |
| 11,876,884 B2 * | 1/2024 | Qi ......................... | H04J 3/0685 |
| 2004/0071389 A1 * | 4/2004 | Hofmeister ............ | H04B 10/40 |
| | | | 385/16 |
| 2005/0196171 A1 | 9/2005 | Dybesetter et al. | |
| 2006/0051099 A1 | 3/2006 | Ekkisogloy et al. | |

(Continued)

OTHER PUBLICATIONS

CFP MSA, CFP MSA Management Interface Specification, 100/40 Gigabit Transceiver Package Multi-Source Agreement, Version 2.6 r06a, Mar. 24, 2017, pp. 1-169.

(Continued)

*Primary Examiner* — Dalzid E Singh
(74) *Attorney, Agent, or Firm* — Baratta Law PLLC; Lawrence A. Baratta, Jr.

(57)          ABSTRACT

An optical module includes a transmitter assembly; a receiver assembly; and circuitry connected to the transmitter assembly and the receiver assembly, wherein the circuitry includes one or more delay elements each configured to add a respective configured amount of delay in one or more of a transmit direction and a receive direction within the optical module. The optical module includes (1) a transmit direction from a host device through the circuitry and the transmitter assembly, and (2) a receive direction to the host device from the receiver assembly and through the circuitry. The one or more delay elements can be configured to introduce a delay in one or both directions to minimize the delay uncertainty associated with the optical module as well as the delay uncertainty on a given link (connection formed between two optical modules).

20 Claims, 6 Drawing Sheets

(56) References Cited

U.S. PATENT DOCUMENTS

| | | | |
|---|---|---|---|
| 2006/0093286 A1 | 5/2006 | Dybsetter et al. | |
| 2006/0093363 A1 | 5/2006 | Dybsetter et al. | |
| 2006/0147216 A1 | 7/2006 | Dybsetter et al. | |
| 2006/0153569 A1 | 7/2006 | Dybsetter et al. | |
| 2006/0153570 A1 | 7/2006 | Nelson et al. | |
| 2006/0159461 A1 | 7/2006 | Nelson et al. | |
| 2006/0215545 A1 | 9/2006 | Nelson | |
| 2006/0216040 A1 | 9/2006 | Nelson et al. | |
| 2007/0065151 A1 | 3/2007 | Dybsetter et al. | |
| 2007/0168679 A1 | 7/2007 | Ekkizogloy et al. | |
| 2007/0196104 A1 | 8/2007 | Nelson et al. | |
| 2007/0223919 A1* | 9/2007 | Kanesaka | H04B 10/66 |
| | | | 398/27 |
| 2009/0168858 A1 | 7/2009 | Luo | |
| 2009/0182531 A1 | 7/2009 | Ekkizogloy et al. | |
| 2012/0301134 A1 | 11/2012 | Davari et al. | |
| 2013/0077968 A1 | 3/2013 | Yang | |
| 2013/0182585 A1 | 7/2013 | Chaudhary et al. | |
| 2014/0024255 A1 | 1/2014 | Robitaille et al. | |
| 2014/0270773 A1 | 9/2014 | Elmoalem et al. | |
| 2015/0086211 A1 | 3/2015 | Coffey et al. | |
| 2017/0013332 A1* | 1/2017 | Hirayama | H04L 49/9005 |
| 2017/0207849 A1 | 7/2017 | Sinclair et al. | |
| 2018/0048391 A1 | 2/2018 | Tanaka et al. | |
| 2019/0103922 A1* | 4/2019 | Akizawa | H04B 10/695 |
| 2019/0326992 A1 | 10/2019 | Charlton et al. | |
| 2020/0007471 A1 | 1/2020 | Estabrooks et al. | |
| 2020/0145106 A1 | 5/2020 | Mazzini et al. | |

OTHER PUBLICATIONS

CFP MSA, CFP2 Hardware Specification, Revision 1.0, Jul. 31, 2013, pp. 1-64.

CFP MSA, CFP4 Hardware Specification, Revision 1.1, Mar. 18, 2015, pp. 1-34.

CFP MSA, CFP8 Hardware Specification, Revision 1.0, Mar. 17, 2017, pp. 1-49.

CFP MSA, Hardware Specification, Revision 1.4, Jun. 7, 2010, pp. 1-53.

OIF, IA OIF-C-CMIS-01.0, Implementation Agreement for Coherent CMIS, Jan. 14, 2020, pp. 1-34.

OSFP MSA, OSFP Octal Small Form Factor Pluggable Module, Rev 3.0, Mar. 14, 2020, pp. 1-99.

Common Management Interface Specification, Published Rev 4.0, May 8, 2019, pp. 1-265.

QSFP-DD MSA, QSFP-DD Hardware Specification for QSFP Double Density 8X Pluggable Transceiver Rev 5.0, Jul. 9, 2019, pp. 1-82.

* cited by examiner

OPTICAL MODULE 10

16

ASIC (DIGITAL)

12 TOSA

ROSA 14

20

HOST DEVICE 10
10
•
•
•
10

PROTOCOL TESTER 70

72

OPTICAL MODULE 10

ASIC (DIGITAL)

16

S1

TOSA 12
S2

ROSA
S3 14

S4 68

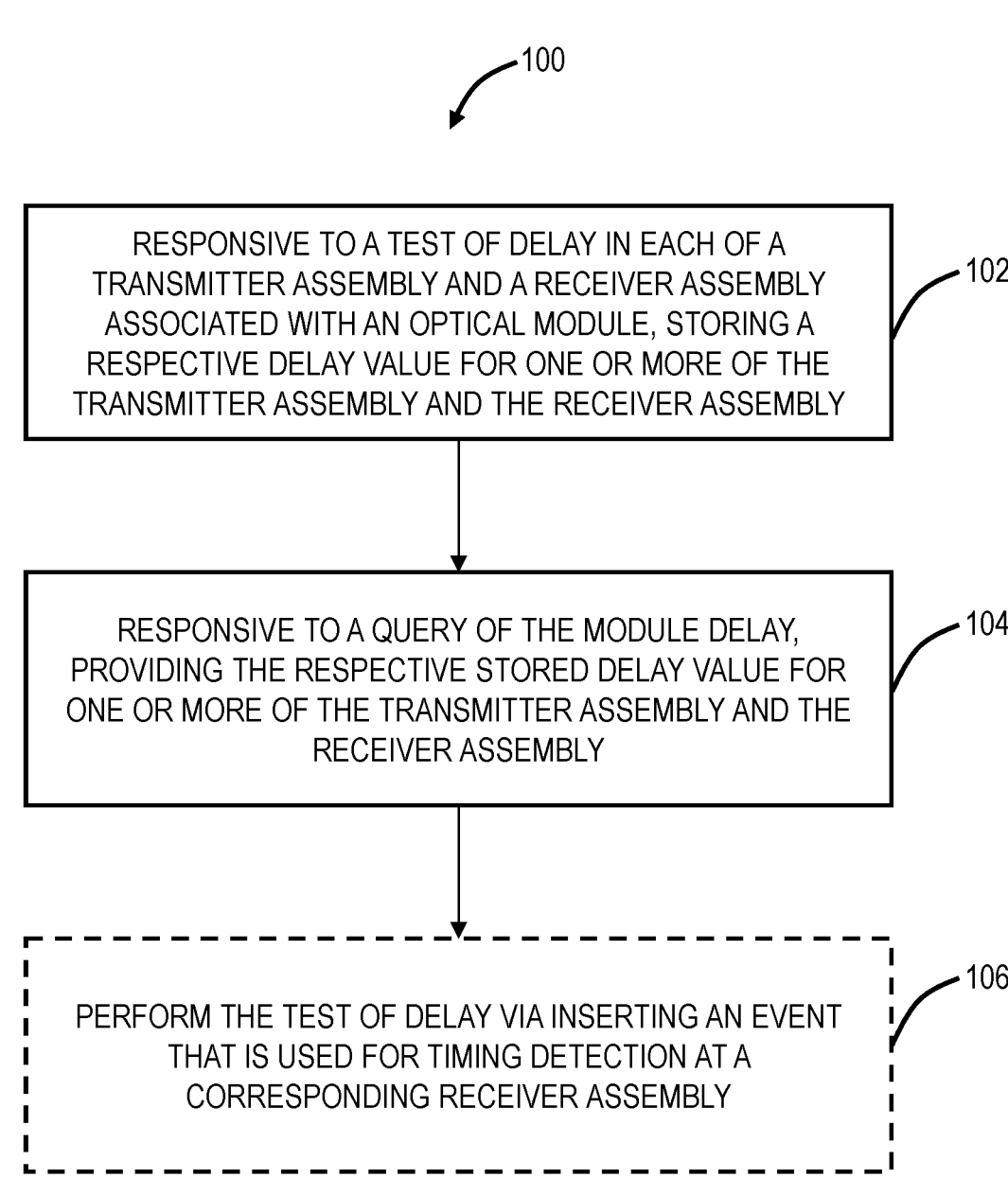

100

RESPONSIVE TO A TEST OF DELAY IN EACH OF A TRANSMITTER ASSEMBLY AND A RECEIVER ASSEMBLY ASSOCIATED WITH AN OPTICAL MODULE, STORING A RESPECTIVE DELAY VALUE FOR ONE OR MORE OF THE TRANSMITTER ASSEMBLY AND THE RECEIVER ASSEMBLY

102

RESPONSIVE TO A QUERY OF THE MODULE DELAY, PROVIDING THE RESPECTIVE STORED DELAY VALUE FOR ONE OR MORE OF THE TRANSMITTER ASSEMBLY AND THE RECEIVER ASSEMBLY

104

PERFORM THE TEST OF DELAY VIA INSERTING AN EVENT THAT IS USED FOR TIMING DETECTION AT A CORRESPONDING RECEIVER ASSEMBLY

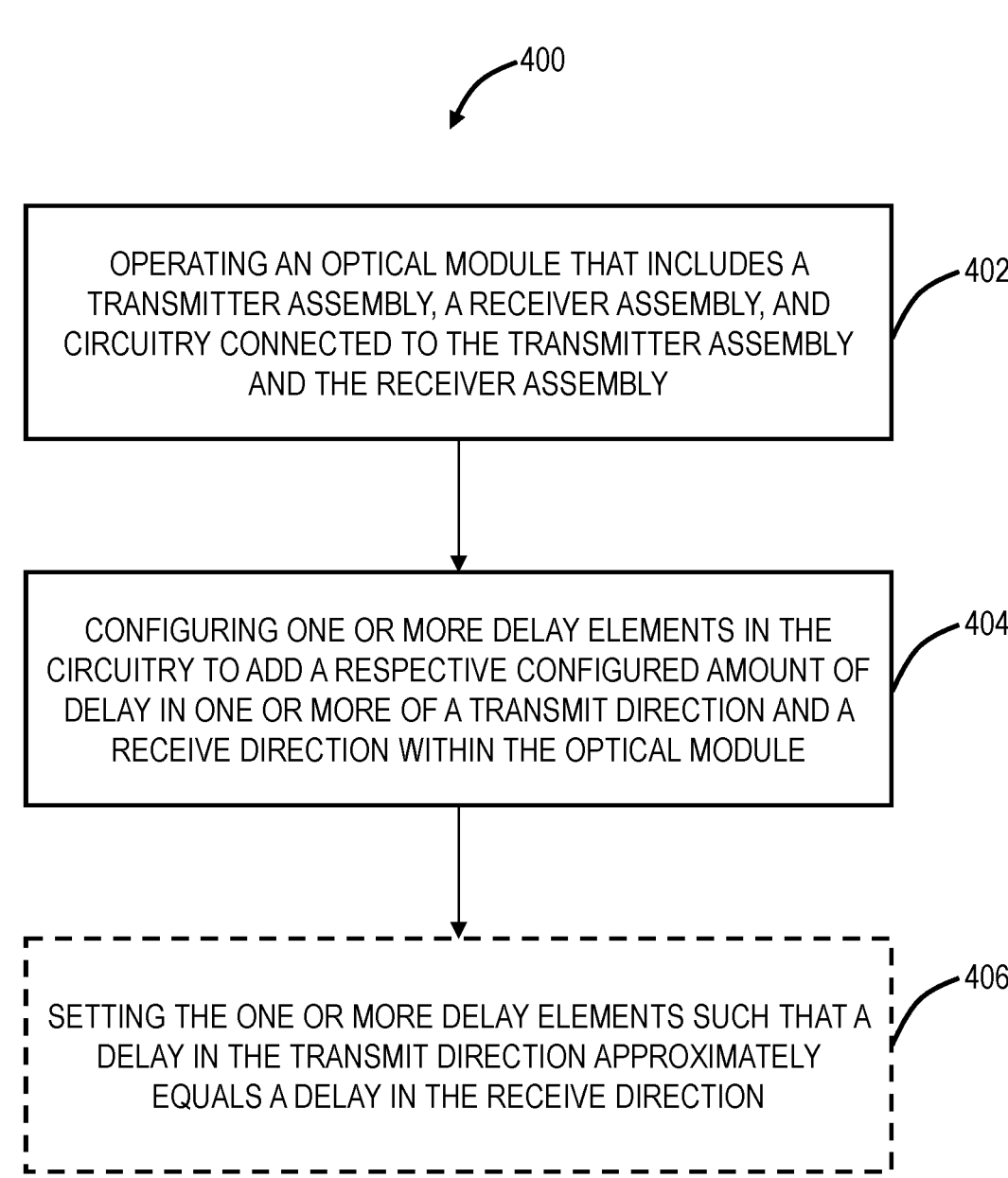

400

OPERATING AN OPTICAL MODULE THAT INCLUDES A TRANSMITTER ASSEMBLY, A RECEIVER ASSEMBLY, AND CIRCUITRY CONNECTED TO THE TRANSMITTER ASSEMBLY AND THE RECEIVER ASSEMBLY

402

CONFIGURING ONE OR MORE DELAY ELEMENTS IN THE CIRCUITRY TO ADD A RESPECTIVE CONFIGURED AMOUNT OF DELAY IN ONE OR MORE OF A TRANSMIT DIRECTION AND A RECEIVE DIRECTION WITHIN THE OPTICAL MODULE

404

SETTING THE ONE OR MORE DELAY ELEMENTS SUCH THAT A DELAY IN THE TRANSMIT DIRECTION APPROXIMATELY EQUALS A DELAY IN THE RECEIVE DIRECTION

OPTICAL DELAY COMPENSATION IN OPTICAL MODULES

FIELD OF THE DISCLOSURE

The present disclosure relates generally to networking and computing. More particularly, the present disclosure relates to systems and methods for optical delay compensation, measurement, and/or calibration in optical modules, including pluggable optical modules.

BACKGROUND OF THE DISCLOSURE

In optical networking, optical interfaces can be realized through pluggable optical modules (also referred to as pluggable modules, pluggable transceivers, plugs, or simply "modules," etc.). The pluggable optical modules can be defined/standardized via Multisource Agreements (MSAs), such as, without limitation, Small Form-factor Pluggable (SFP), 10 Gigabit small Form-factor Pluggable (XFP), Quad SFP (QSFP) and variants thereof, Octal SFP (OSFP) and variants thereof, C Form-factor Pluggable (CFP) and variants thereof, Digital Coherent Optics (DCO), 400ZR, Consortium for On-Board Optics (COBO), etc. Of course, pluggable optical modules can also be proprietary vendor implementations as well. Additionally, new MSAs and the like are continually emerging to address new services, applications, and advanced technology. Standardization allows multiple vendors to design and supply pluggable optical modules reducing risk for vendors and operators, increasing flexibility, and accelerating the introduction of new technology. The standards define the pluggable optical module's mechanical characteristics, management interfaces, electrical characteristics, optical characteristics, power consumption, and thermal requirements. In use, pluggable optical modules are used by networking hardware, such as switches, routers, etc., to provide optical interconnect. Note, as described herein, the terms "optical module," "coherent optical module," "coherent module," "pluggable module," "coherent pluggable module," and variations thereof are all equivalent, and can merely be referred to as an optical module or simply a module. Also, the present disclosure relates to any optical module or module, whether pluggable or not (e.g., an optical sub-assembly).

From a management perspective, for example, the IA OIF-C-CMIS-01.0 "Implementation Agreement for Coherent CMIS," Jan. 14, 2020, from the Optical Internetworking Forum, the contents of which are incorporated by reference herein, defines management interfaces for 400ZR modules and future 800ZR modules. The Common Management Interface Specification (CMIS), Rev. 4.0, May 8, 2019, from the QSFP-DD MSA Group, the contents of which are incorporated by reference herein, defines a management communication based on a Two-Wire-Interface (TWI), for QSFP Double Density (QSFP-DD), OSFP, COBO, QSFP, and SFP-DD. QSFP-DD modules are defined in the QSFP-DD Hardware Specification for QSFP DOUBLE DENSITY 8× PLUGGABLE TRANSCEIVER, Rev 5.0, Jul. 9, 2019, the contents of which are incorporated by reference.

Coherent optical modules, including pluggable optical modules, are starting to get deployed in applications towards the edge of the network that are sensitive to delay uncertainty. In these applications, mostly related to mobile/wireless (e.g., 5G), delay uncertainty translates to time transfer error and the applications have a certain tolerance to this time error. There are certain "Classes" of acceptable constant time error (cTE) defined, that network equipment must adhere to. For example, Class A is ±50 ns, Class B is ±20 ns, Class C is ±10 ns, Class D includes single digit ns, such as ±5 ns. The Classes are associated to the network element (NE), and components within the NE (e.g., a coherent optical module) get a portion of this budget. Of note, the time Class is a spec covering an entire network element, i.e., nodal specification, and a small portion, typically 10-20% of the cTE budget is allocated to the optical modules.

As described herein, delay, latency, time error, cTE, delay uncertainty, etc. all refer to a time value. An optical module provides bidirectional communication, i.e., transmit and receive, forming a communication channel. Delay and latency can be used interchangeably in this disclosure, both referred to a time value characterizing an amount of time it takes signals to propagate through the optical module in one direction, i.e., either transmit or receive. Also, time error, delay uncertainty, etc. can be used interchangeably in this disclosure to refer to a difference in time between the two directions, i.e., between the transmit and the receive directions. Ideally, an optical module would have the same exact delay in the transmit and received directions, i.e., no cTE. This is not the case in practical devices. There is a need to measure the delay, calibrate the optical module based on the measured delay, and to compensate for any time error between the directions in the optical module.

BRIEF SUMMARY OF THE DISCLOSURE

Again, the present disclosure relates to systems and methods for optical delay compensation, measurement, and/or calibration in optical modules, including pluggable optical modules as well as non-pluggable optical modules or components. In an embodiment, the present disclosure includes a tunable digital delay element within an optical module, and the tunable digital delay element is configured to introduce delay in the digital domain to reduce timing error in the optical module. In another embodiment, this disclosure covers novel approaches to calibrate and factor out optical assembly (Receiver Optical Sub Assembly (ROSA)/Transmitter Optical Sub Assembly (TOSA)) delay uncertainties. Once the transmitter and receiver optical assembly delays are known and stored during manufacturing processes, they can then be added to the protocol/digital (dynamically measured) delays and reported at the full module level. Of note, the approach of calibration to store the transmitter and receiver optical assembly delays can be used in combination with the tunable digital delay element to compensate the transmitter or receiver optical assembly delays. Advantageously, the approaches described herein compensate for any delay uncertainty in the optical module, without relying on external reporting for compensation at higher layer protocols.

In an embodiment, an optical module includes a transmitter assembly; a receiver assembly; and circuitry connected to the transmitter assembly and the receiver assembly, wherein the circuitry includes one or more delay elements each configured to add a respective configured amount of delay in one or more of a transmit direction and a receive direction within the optical module. The transmit direction is from a host device through the circuitry and the transmitter assembly, and wherein the receive direction is to the host device from the receiver assembly and through the circuitry. The one or more delay elements can be configured such that a delay in the transmit direction approximately equals a delay in the receive direction. The one or more delay elements can include a single delay element on the receive direction, and wherein the amount of the delay is based on a difference between a delay in the transmit direction and the receive direction.

There can be variable delay in the transmit direction relative to the receive direction based on one or more of (1) a different optical delay associated with each of the transmitter assembly and the receiver assembly, and (2) digital delay in the circuitry associated with each of the transmit direction and the receive direction. The one or more delay elements can include First-In-First-Out (FIFO) elements in the circuitry. The amount of delay can be based on a respective stored delay value for one or more of the transmitter assembly and the receiver assembly. The respective stored delay value for one or more of the transmitter assembly and the receiver assembly can be responsive to a test of delay in one or more of the transmitter assembly and the receiver assembly. The amount of delay can be based on a test of delay in each of the transmitter assembly and the receiver assembly. The amount of delay can be based on one or more of (1) a test of delay in each of the transmitter assembly and the receiver assembly, and (2) a determination of delay in the circuitry.

In another embodiment, a method includes operating an optical module that includes a transmitter assembly, a receiver assembly, and circuitry connected to the transmitter assembly and the receiver assembly; and configuring one or more delay elements in the circuitry to add a respective configured amount of delay in one or more of a transmit direction and a receive direction within the optical module. The transmit direction is from a host device through the circuitry and the transmitter assembly, and wherein the receive direction is to the host device from the receiver assembly and through the circuitry. The method can further include setting the one or more delay elements such that a delay in the transmit direction approximately equals a delay in the receive direction. The one or more delay elements can include a single delay element on the receive direction, and the method can further include setting the amount of the delay based on a difference between a delay in the transmit direction and the receive direction.

There can be variable delay in the transmit direction relative to the receive direction based on one or more of (1) a different optical delay associated with each of the transmitter assembly and the receiver assembly, and (2) digital delay in the circuitry associated with each of the transmit direction and the receive direction. The one or more delay elements can include First-In-First-Out (FIFO) elements in the circuitry. The method can further include determining the amount of delay based on a respective stored delay value for one or more of the transmitter assembly and the receiver assembly. The respective stored delay value for one or more of the transmitter assembly and the receiver assembly can be responsive to a test of delay in one or more of the transmitter assembly and the receiver assembly. The amount of delay can be based on a test of delay in each of the transmitter assembly and the receiver assembly. The amount of delay can be based on one or more of (1) a test of delay in each of the transmitter assembly and the receiver assembly, and (2) a determination of delay in the circuitry.

In an embodiment, an optical module includes a transmitter assembly; a receiver assembly; and circuitry connected to the transmitter assembly and the receiver assembly, wherein the circuitry is configured to, responsive to a test of delay in each of the transmitter assembly and the receiver assembly, store a delay value for one or more of the transmitter assembly and the receiver assembly, and, responsive to a query of the delay, provide the respective stored delay value for the one or more of the transmitter and the receiver assemblies. The circuitry can be further configured to perform the test of delay via inserting an event that is used for timing detection at a corresponding receiver assembly. The event can be one or more of a Digital Signal Processor (DSP) symbol, a signal in a digital protocol layer, and a test pattern. The corresponding receiver assembly can be the receiver assembly in a loopback configuration. The delay value for each of the transmitter assembly and the receiver assembly can be determined by separating an overall delay in the loopback configuration based on a predetermined split. The corresponding receiver assembly can be a receiver assembly in a second optical module having known delay values that are made available to the optical module. The optical module and the second optical module can be synchronized to one another via an embedded pulse per second (ePPS). The test of delay can be performed with an external test set. The optical delay can be due to one or more components including splitters, Variable Optical Attenuators (VOAs), Tunable Optical Filters (TOFs), optical amplifiers, and internal fibers interconnecting the one or more components. The respective stored delay value for each of the transmitter assembly and the receiver assembly can be in registers associated with the circuitry.

In another embodiment, a method includes steps of, responsive to a test of delay in each of a transmitter assembly and a receiver assembly associated with an optical module, storing a delay value for one or more of the transmitter assembly and the receiver assembly; and, responsive to a query of the module delay, providing the respective stored delay value for one or more of the transmitter assembly and the receiver assembly. The steps can further include perform the test of delay via inserting an event that is used for timing detection at a corresponding receiver assembly. The event can be one or more of a Digital Signal Processor (DSP) symbol, a signal in a digital protocol layer, and a test pattern. The corresponding receiver assembly can be the receiver assembly in a loopback configuration. The delay value for each of the transmitter assembly and the receiver assembly can be determined by separating a combined delay in the loopback configuration based on a predetermined split. The corresponding receiver assembly can be a receiver assembly in a second optical module having known delay values that are made available to the optical module. The optical module and the second optical module can be synchronized to one another via an embedded pulse per second (ePPS). The test of delay can be performed with an external test set. The optical delay can be due to one or more components including splitters, Variable Optical Attenuators (VOAs), Tunable Optical Filters (TOFs), optical amplifiers, and internal fibers interconnecting the one or more components. The respective stored delay value for each of the transmitter assembly and the receiver assembly can be in registers associated with the circuitry.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a flowchart of a process for optical delay calibration of optical modules.

FIG. 10 is a flowchart of a process for optical delay compensation of optical modules.

DETAILED DESCRIPTION OF THE DISCLOSURE

Again, the present disclosure relates to systems and methods for optical delay compensation, measurement, and/or calibration in optical modules, including pluggable optical modules as well as non-pluggable optical modules or components. The present disclosure provides various approaches to measure, determine, and calibrate delay through an optical module, in both directions, transmit and receive, and through both optical components and digital components. Once the time error is determined, it is possible to introduce a delay in the digital domain for compensation.

In an embodiment, this disclosure covers novel approaches to calibrate and factor out optical assembly (ROSA/TOSA) delay uncertainties, as well as to compensate for such delays via a tunable digital delay element in the digital domain. Once the transmitter and receiver optical assembly delays are known and stored during manufacturing processes, they can then be added to the protocol/digital (dynamically measured) delays and reported as a value encompassing the full module. The present disclosure includes:

(i) Storing of transmit and receive path optical parameters, such as in module non-volatile memory, to be used in computation of module latency reporting values in standard CMIS registers or the like.

(ii) Required hooks, that will be incorporated into the module (design) that will facilitate optical measurement (during manufacturing process). These hooks are circuitry or the like to perform the measurements.

(iii) One (or more) delay measurement procedures (used during manufacturing process) and leveraging the hooks (as in (ii) above) and storing the measured optical delays in the standard registers (as in (i) above).

In another embodiment, this disclosure utilizes delay measurements to introduce a delay in the digital domain, namely:

(iv) A tunable digital delay element in the digital domain that can be configured to introduce a delay in one or both directions to minimize the delay uncertainty associated with the optical module as well as the delay uncertainty on a given link (connection formed between two optical modules). Advantageously, this approach is performed within the optical module thereby removing the need to report delay and the need for higher-layer protocols to address the reported delay. Tuning the delay of the digital delay element in response to the instructions of higher-level software, devices, protocols is another option that has potential value, for example, in cases where unidirectional link delay is measured using a common timebase and then equalized in both directions.

Optical Module

Figures 1, 2, 3:
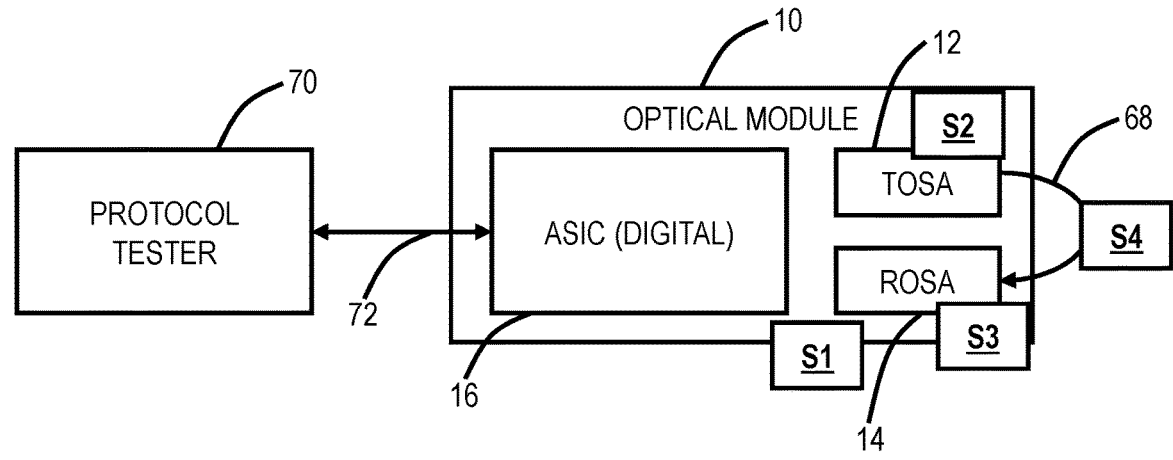
FIG. 1 is a block diagram of an optical module.
FIG. 2 is a block diagram of a host device with multiple pluggable optical modules included therein.
FIG. 3 is a block diagram of a module illustrating a round trip delay measurement.

FIG. 1 is a block diagram of an optical module 10. For simplicity of illustration, the optical module 10 includes a transmitter assembly 12 (TOSA 12), a receiver assembly 14 (ROSA 14), and circuitry 16, such as an ASIC 16, DSP 16, etc. Again, in an embodiment, the optical module 10 is one of a Small Form-factor Pluggable (SFP), 10 Gigabit small Form-factor Pluggable (XFP), Quad SFP (QSFP) and variants thereof, Octal SFP (OSFP) and variants thereof, C Form-factor Pluggable (CFP) and variants thereof, Digital Coherent Optics (DCO), 400ZR, Consortium for On-Board Optics (COBO), etc. In another embodiment, the optical module 10 can be a proprietary module. In a further embodiment, the optical module 10 can be another type of pluggable module, a fixed module, and the like.

Those skilled in the art will recognize the present disclosure contemplates implementation with any coherent optical module. Note, the optical module 10 is presented herein as an example type of optical modules. Those skilled in the art will recognize the systems and method described herein contemplate operation with any type of pluggable optical module, including ones using the CMIS or Coherent CMIS management standards, as well as other modules that support other types of management.

FIG. 2 is a block diagram of a host device 20 with multiple pluggable optical modules 10 included therein. The host device 20 can include a switch, a router, a Wavelength Division Multiplexing (WDM) terminal, a server, a storage device, server, and the like. That is, the host device 20 can include any networking, computing, and/or storage device. The pluggable optical modules 10 are used to provide optical interfaces between the host device 20 and an external device, such as a transponder, another switch, router, etc., and the like. Operationally, the host device 20 is configured to receive any compliant pluggable optical module 10.

Again, while shown as "pluggable" optical modules 10, those skilled in the art will recognize the present disclosure is intended for any type of module, including pluggable as well as non-pluggable modules, such as optical subassemblies mounted on a module.

Management

Protocols such as MDIO, I2C, and the like are used for communicating management data between the host device 20 and the module 10. This can include reading and writing data in registers or memory on the module 10. CMIS can include a page in registers or memory for reporting of module's 10 latency, including separate contributions for Tx and Rx paths. Also, custom implementation can include custom register maps include similar reporting registers.

Latency Reporting—Digital Contributions

Again, existing approaches for reporting latency in optical modules focus on the digital contributions of latency, e.g., due to mapping, Forward Error Correction (FEC), FIFOs, and similar digital stages. There have been contributions in standards based on using an enhanced pulse per second (ePPS) to calibrate the propagation delays through the Tx and Rx Digital Signal Processor (DSP) paths. This focuses entirely on the electrical paths. Variations of the optical path, such as from internal EDFA's are not included. Amplified modules have multiple nanoseconds of variation from EDFA's, and meeting this spec required manufacturers to tighten their manufacturing tolerances.

Many modern coherent optical module implementations, especially those based on Silicon Photonics, do not use self-contained optical assemblies. The electro-optical components are integrated into the module, as multiple components. Silicon Photonic devices are often bonded or integrated (Substrate Like PCB (SLP), High Density Build-Up (HDBU)) with the digital Application Specific Integrated Circuity (ASIC) and cannot be measured separately. The optical components such as isolators, amplifiers, and power monitoring taps are often assembled in final stages of module assembly.

Latency Reporting—Optical Contributions

The present disclosure focuses on other techniques using "hooks" integrated in the module, leveraged for accurate latency measurements. The procedure can be performed at final stages of manufacturing containing all optical components.

The present disclosure includes storing latency measurements, for the optical contributions, including the Tx and Rx path, either together or separately. These can also be provided with the digital contributions. An operator, a control plane, a management system, PTP algorithms on a host product, etc. can query these values to determine latency contribution for the module. This can be used in assisting time transfer algorithms and minimize the total time error of the network equipment (NE). By storing calibrated optical delays, and factoring them, we will be able to reduce the timing uncertainty to meet strict Class requirements of certain applications. In the future this will be increasingly important for meeting increasingly tighter timing requirements.

Again, the present disclosure includes i) Storing of transmit and receive path optical parameters, such as in module non-volatile memory, to be used in computation of module latency reporting values in standard CMIS registers or the like.

ii) Required hooks, that will be incorporated into the module (design) that will facilitate optical measurement delays (e.g., during manufacturing process). These hooks are circuitry or the like to perform the measurements.

iii) One (or more) delay measurement procedures (e.g., used during manufacturing process) and leveraging the hooks (as in (ii) above) and storing the measured optical delays in the standard registers (as in (i) above).

Processes for Measuring on Module Optical Latency

For measuring, storing, and reporting optical latency, the present disclosure provides two example approaches with a tradeoff of simplicity versus accuracy. These approaches can be introduced in the final stages of manufacturing.

Approach A—Round Trip Delay (Loopback)

FIG. 3 is a block diagram of a module 10 illustrating a round trip delay measurement. As described herein, the module 10 can be one of the pluggable optical modules 10, another type of pluggable optical module, an optical subassembly that is integrated with another module in a network element, e.g., mounted on a Printed Circuit Board (PCB), or any implementation of a transceiver, transponder, optical modem, etc.

The module 10 can include an ASIC 16, a TOSA 12, and a ROSA 14. Of course, other embodiments are possible, and this is presented as a high-level functional view. The ASIC 16 can be a single or multiple circuits, e.g., a DSP. The TOSA 12 and ROSA 14 are the electro-optic components for a transmitter and a receiver, respectively.

The approach A is simpler than the approach B (below). The module 10 is tested in isolation, without the need for an external line side test setup (the TOSA 12 is connected to the ROSA 14), i.e., the line side is looped back to itself with a fixed and known fiber length, i.e., fiber 68. For example, the fiber 68 can be an internal connection, a patch cord, a setting in a Wavelength Selective Switch (WSS), etc. The key here is it is a known and fixed optical connection.

In an embodiment, the approach A includes the digital ASIC, on the line side (step S1) initiating an event on its transmitter (step S2), and then detects the event on its receiver (step S3) (through the loopback (step S4)). The event can be a signal from the protocol layer, for example a Flexible Optical (FlexO)/ZR multiframe, a FlexO reserved field, FEC, etc. The event can also be from the DSP symbols, for example, in the DSP multiframe or DSP padding area. This would be the most precise point within the digital ASIC. The event can also be a test pattern, such as a pseudorandom binary sequence (PRBS). The event is used to detect timing, e.g., optical latency=detection time of the event in the Rx minus detection time of the event in the Tx. The round-trip delay is calculated at the digital ASIC 16 on the line side as the Rx time-Tx time. This is expected to be static since it contains minimal digital processes, and should cover both the TOSA 16 and the ROSA 14.

The delay due to the known fiber length can be subtracted from this value to get an accurate representation of the TOSA+ROSA optical latency. This can be determined by the fiber length and the speed of light inside the fiber (based on the fiber medium). The bulk of the uncertainty is typically in the TOSA 12, given that it can contain an EDFA which includes a spool of doped fiber.

The approach A has a drawback that the ROSA 14 and TOSA 12 uncertainties are lumped together, and must be estimated to separate them. In an implementation, we have observed that ROSA is ~10% delay and TOSA is ~90% of the measured delay introduced by the optical assembly. Note, there is a need to have the ROSA 14 and TOSA 12 delays separate since in a practical implementation the ROSA 14 and TOSA 12 will be connected to an adjacent module 10, not in a loopback. So, to the optical latency, is the sum of the delay from the ROSA 14 on one end with the delay from the TOSA on the other end 12.

The TOSA 12 and ROSA 14 independent values can be stored in Non-Volatile Memory (NVM) in the module 10.

In another embodiment, with the approach A, a test set 70 can be used to measure round-trip delay as described above, but instead of sourcing the timing event at the line side of the digital ASIC 16, it is sourced and measured by the test set 70. A fiber 72 and the digital portion of the ASIC 16 can be removed from this calibrated value, and the uncertainty of the ASIC 16 will show up in the measurement.

Approach B—Unidirectional Delay

Figure 4:
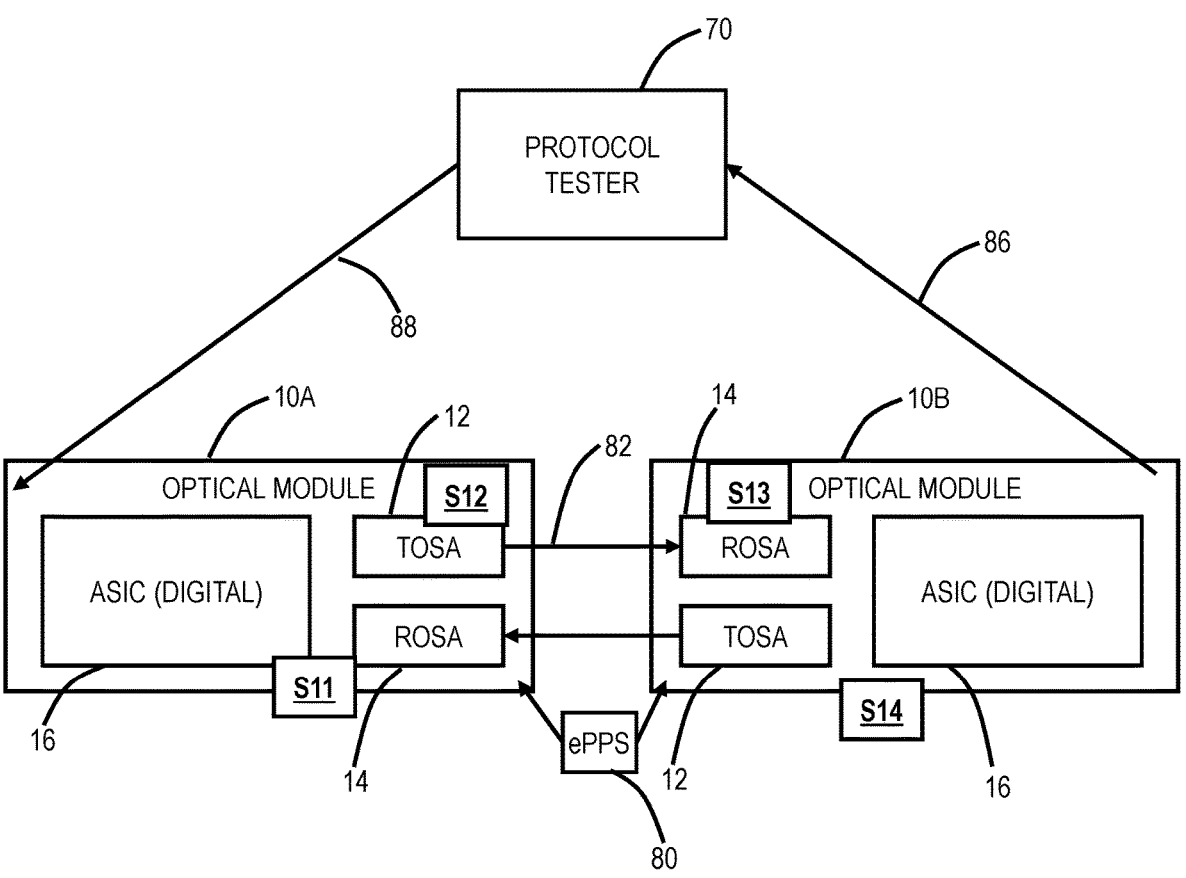
FIG. 4 is a block diagram of modules illustrating a unidirectional delay measurement.

FIG. 4 is a block diagram of modules 10A, 10B illustrating a unidirectional delay measurement. This approach B requires a known good (calibrated) receiver and transmitter in the setup, e.g., an optical module 10A is under test whereas an optical module 10B has known values. The setup will also require a time base (e.g., ePPS signal) sent to both modules 10A, 10B. This is the most accurate of the two disclosed approaches, since TOSA 12 and ROSA 14 can be measured independently.

The digital ASIC 16 for the module 10A under test on the line side (step 11) initiates an event on its transmitter (step 12), and then the event is detected on the receiver (step 13) of the known good optical module 10B (step S14). The events are the same as approach A.

Both modules 10A, 10B share the same concept of time, distributed using an ePPS signal 80 on the module connectors, which is now a standard pin in most module form factor MSAs.

The unidirectional delay is calculated as the Rx time (step 14)–Tx time (step 11). This is expected to be static since it contains minimal digital processes, and should cover both the TOSA 12 in the module 10A and the ROSA 14 of the module 10B. Delays associated with the known fiber length of a fiber 82 and the known ROSA 14 of the module 10B can be subtracted from this value to get an accurate representation of the delay of the TOSA 12 in the module 10A. Note, whichever module 10A, 10B performs this calculation—in either case the Tx time or the Rx time, referenced, has to be made available to the other module for the unidirectional delay calculation to be performed by the other module.

The similar and opposite process can be used to measure the ROSA 14 of the module 10A under test. Subsequent to the respective tests, the TOSA 12 and ROSA 14 independent values can be stored in Non-Volatile Memory (NVM) in the module 10A.

In another embodiment, the test set 70 can be used to measure the unidirectional delay as described above, but instead of the source/destination timing events at steps S11, S14, it is sourced and measured by the test set 70.

Reporting

In normal module operation, the latency value can be reported, Tx and Rx separately, in the CMIS registers or the like. These values are computed from the dynamic digital values in the ASIC 16 and static optical values computed by the method disclosed above. The industry has recently defined standard registers (e.g., Page 15h CMIS, previously incorporated herein) for modules to report the latency values, but do not specify how to obtain accurate values.

Delay Calibration Process

FIG. 5 is a flowchart of a process 100 for optical delay calibration of optical modules. The process 100 contemplates operation with the modules 10, and the like. The process 100 includes, responsive to a test of delay in each of a transmitter assembly and a receiver assembly associated with an optical module, storing a respective delay value for one or more of the transmitter assembly and the receiver assembly (step 102); and, responsive to a query of the module delay, providing the respective stored delay value for one or more of the transmitter assembly and the receiver assembly (step 104). The query can be via a command line, via a management system, etc., and can be used to compute latency on a path, including the optical delay along with digital delay. The expectation is specific modules will have low nanosecond optical delay will be selected for Class B, C, etc. applications.

The process 100 can further include performing the test of delay via inserting an event that is used for timing detection at a corresponding receiver assembly (step 106). The event can be one or more of a Digital Signal Processor (DSP) symbol, a signal in a protocol, and a test pattern.

In an embodiment, e.g., approach A, the corresponding receiver assembly is the receiver assembly in a loopback configuration. The optical delay value for each of the transmitter assembly and the receiver assembly can be determined by separating an overall delay in the loopback configuration.

In another embodiment, e.g., approach B, the corresponding receiver assembly is a receiver assembly in a second optical module having known delay values. The optical module and the other optical module can be synchronized to one another via an embedded pulse per second (ePPS).

In a further embodiment, the test of optical delay can be performed with an external test set.

The optical delay is due to one or more components including splitters, Variable Optical Attenuators (VOAs), Tunable Optical Filters (TOFs), optical amplifiers, e.g., EDFAs, and internal fibers interconnecting the one or more components. The stored optical delay value for each of the transmitter assembly and the receiver assembly can be in registers associated with the circuitry.

Optical Module Delay

Figures 6, 7:
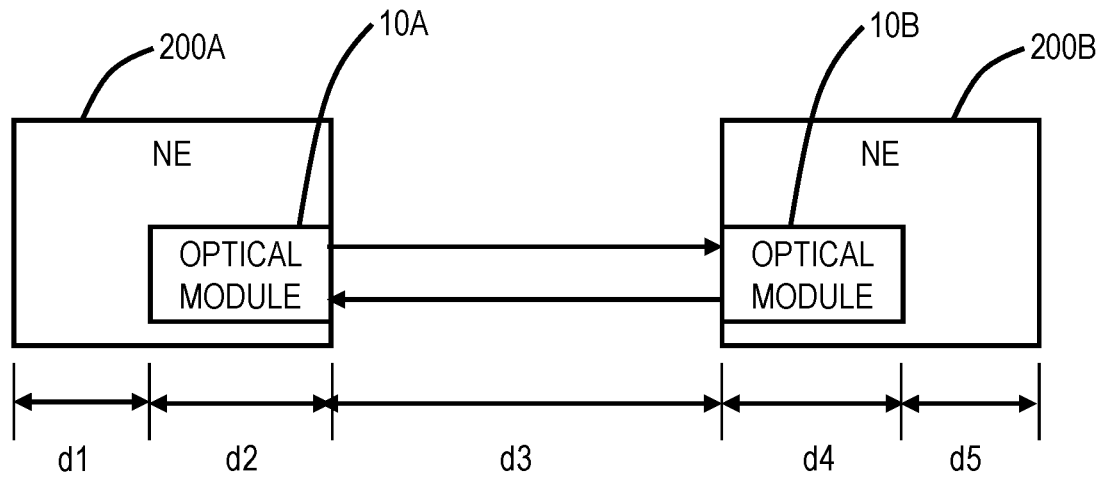
FIG. 6 is a block diagram of the optical module for describing delay uncertainty between a transmit direction and a receive direction.
FIG. 7 is a network diagram of two network elements, connected to one another via two optical modules, for illustrating delay.

FIG. 6 is a block diagram of the optical module 10 for describing delay uncertainty between a transmit direction 150 and a receive direction 152. Functionally, the optical module 10 is configured to interface a communication channel which is bidirectional having communication in both the transmit direction 150 and the receive direction 152. At a high level, the circuitry 16 is configured to perform digital functions and interface the communication channel with the host device 20. The transmitter assembly 12 is configured to optically transmit in the transmit direction 150 to an adjacent optical module 10, and the receiver assembly 14 is configured to optically receive in the receive direction 152 from the adjacent optical module 10. The transmitter assembly 12 and the receiver assembly 14 connect to and interface with the circuitry 16. The present disclosure relates to timing differences, i.e., delay uncertainty, etc., between the transmit direction 150 and the receive direction 152.

There are two main sources of latency uncertainty (which translates to time error) in optical module 10. These can be referred to as digital delay, in the circuitry 16, and optical delay, in the transmitter assembly 12 and the receiver assembly 14. Again, we could just as well call these digital latency and optical latency. The digital delay is due to protocol processes, delay elements (First-In-First-Outs (FIFOs)), Serializer-Deserializer (SERDES), FEC processing, and the like, in the circuitry 16. That is, the digital processing in both the transmit direction 150 and the receive direction 152 adds time, and this added time may be different in the transmit direction 150 from the receive direction 152.

There have been previous disclosures that focus on measuring and compensating for the digital delay, at higherlayers, e.g., U.S. Pat. No. 10,594,395, "Systems and methods for compensating coherent optics delay asymmetry in a packet optical network," issued Mar. 17, 2020, and U.S. Pat. No. 10,313,103, "Systems and methods for precise time synchronization with optical module," issued Jun. 4, 2019, the contents of both are incorporated by reference in their entirety. These focus on performing timing transfer using the coherent modem itself, e.g., Precision Time Protocol (PTP) over Optical Transport Network (OTN). This is one way to address the issue, namely use PTP for measurements and rely on external processes to compensate based thereon; however, it is more challenging to operationalize for pure Ethernet/IP switching/routing products. Some applications want to leverage module latency reporting to minimize the time error introduced by the coherent module and perform the timing transfer at the Ethernet/IP layer.

The optical delay is related to optical components in the transmitter assembly 12 and the receiver assembly 14. A coherent optical module can contain various components (splitters, Variable Optical Attenuators (VOAs), Tunable Optical Filter (TOF), and the like) however the main source of delay uncertainty is often found in the Erbium-Doped Fiber Amplifier (EDFA) (optical amplifier), given that these are built from doped fiber spools. The fiber spools have a certain length tolerance measured in meters. Previous measurements have shown that this uncertainty can be significant (e.g., on the order of nanoseconds) and makes meeting certain application Classes quite challenging. That is, these components include fiber spools and signal transmission over the associated length can add delay.

In various embodiments described herein, the present disclosure addressed various techniques to measure and store values for the optical delay. Accordingly, for the purposes of compensation, it can be assumed the delay values, delay uncertainty, etc. between the directions 150, 152 is known.

Delay Sensitive Network Applications

FIG. 7 is a network diagram of two network elements 200A, 200B, connected to one another via two optical modules 10A, 10B, for illustrating delay. The network elements 200A, 200B are the host devices 20 described herein. The delays can be referred to as delays d1, d2, d3, d4, d5. Delays d1, d5 are within the network elements 200A, 200B, and delay d3 is in the optical fiber. The delays d2, d4 are within the optical modules 10A, 10B. The present disclosure addresses the delays d2, d4 with the objective of making the delay values predictable, i.e., removing the delay uncertainty.

Again, in delay sensitive network applications, delay uncertainty translates to time transfer error and applications have a certain tolerance to this time error. Also, as described herein, there are certain "Classes" of acceptable constant time error (cTE) defined, that network equipment must adhere to. For example, Class A is ±50 ns, Class B is ±20 ns, Class C is ±10 ns, Class D includes single ns, such as ±5 ns. Constant time error (cTE) is the mean of time error values that have been measured. cTE represents an average offset from the reference clock as a single value. The objective herein is to lower the cTE value. Also, the Classes are associated to the network elements 200A, 200B, and the optical modules 10A, 10B get a portion of this budget.

That is, these Classes specify the variance in cTE. The present disclosure provides an approach to reduce this variance, i.e., delay uncertainty, with the objective of tightening the delay uncertainty in the optical module 10. Advantageously, this would allow the optical module 10 to be used to Class D or beyond applications that have tight cTE specifications. In an ideal scenario, the reduction in the variation would be close to zero such that the optical module 10 contributed very little to the cTE budget.

Digital Delay

Figures 8, 9:
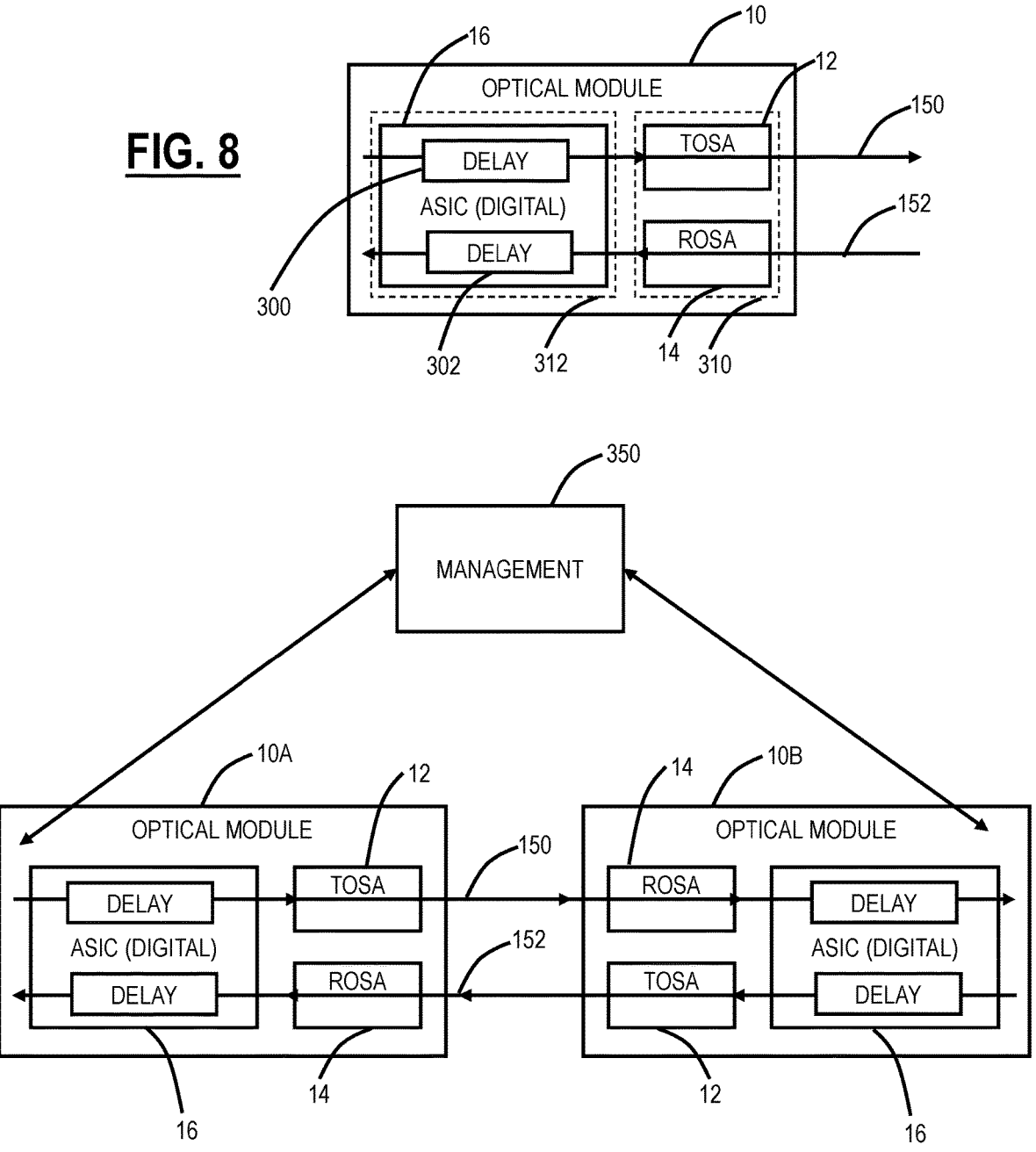
FIG. 8 is a block diagram of the optical module with delay elements in the digital domain, i.e., the circuitry.
FIG. 9 is a block diagram of a link formed between two optical modules, each having the delay elements therein.

FIG. 8 is a block diagram of the optical module 10 with delay elements 300, 302 in the digital domain, i.e., the circuitry 16. Again, latency or delay data is available or obtainable based on the various techniques described herein. The present disclosure makes use of the optical assembly latency data to digitally compensate for the optical assembly latency variation via one or more of the delay elements 300, 302. In practice, this allows a population of optical modules 10 to achieve a tighter cTE specification than would otherwise be possible, thereby meeting the cTE requirements of a better timing Class for the optical module 10 and the host device 20/network element 200 where it is deployed.

The delay elements 300, 302 are configured to add delay or latency in their direction 150, 152, i.e., the delay element 300 adds delay in the transmit direction 150 and the delay element 302 adds delay in the receive direction 152. The delay elements 300, 302 can include FIFOs in the circuitry 16, e.g., FIFOs configured to buffer and release data at some tunable interval to provide a configured amount of delay. Thus, the delay elements 300, 302 can be referred to as tunable digital delay elements.

The general principle for compensation is to use one or more of the delay elements 300, 302 to compensate for variation in the optical path latency (i.e., optical delay) to equalize the overall optical-plus-electrical path latency for the optical module 10, reducing the overall module latency variation and enabling supporting a tighter cTE specification. That is, the goal is to minimize the variation between the directions 150, 152, to provide a tighter cTE specification for the optical module 10.

Note, in FIG. 8, the delay elements 300, 302 are shown on both the directions 150, 152. In another embodiment, there can be a single delay element 302, on the receive direction 152, since the larger delay variation is on the transmit direction 150. Those skilled in the art will appreciate there can be various embodiments with the delay elements 300, 302, all of which are contemplated herein.

The objective of the delay elements 300, 302 is to configure the optical module 10 to minimize the delay difference between the directions 150, 152, thereby minimizing the cTE of the optical module 10. Those skilled in the art will recognize the aspect of minimizing the delay difference, tightening the cTE specification, etc. are meant to mean some improvement from a situation where there is no delay element in the optical module 10, and not necessarily an absolute best value. That is, while minimize, tighten, etc. may be regarded as subjective terms, those skilled in the art will appreciate in this disclosure they are used to refer to an improvement based on use of one or more of the delay elements 300, 302.

Again, as described herein, the optical modules 10 can include a measurement of the optical path latency or delay of the TOSA and ROSA subassemblies (the transmitter assembly 12 and the receiver assembly 14) on a per-device basis. The optical path latency values can be stored in the optical module 10, such as in the circuitry 16, in Non-volatile Memory (NVM), etc. Of course, these values can also be stored off the device, in the cloud, in a management system, etc. These optical path latencies will have a distribution for a population of devices. Having this per-device optical path latency data available enables digitally compensating for the optical path latency distribution to equalize the total optical-plus-electrical module latency in each optical module 10.

In an embodiment, a target optical-plus-electrical-compensation path latency can be chosen based on the maximum expected optical path latency across the population of transmit assemblies 12, e.g., based on EDFA assemblies, plus some small latency margin. The FIFO fill(s), i.e., the delay elements 300, 302, in the electrical data path can be tuned to add a variable latency to achieve this overall module optical-plus-electrical latency target for each optical module 10, effectively equalizing the overall module latency for all devices in the population of modules 10.

In FIG. 8, optical latency variation of an optical path 310 can be compensated by tuning the delay elements 300, 302 (e.g., FIFO(s) in the digital ASIC, i.e., a digital path 312) such as with the per-module latency data stored in the module NVM. That is, the delay elements 300, 302 can be tuned to accommodate for variable delay in the optical path 310 between the transmit direction 150 and the receive direction 152.

Those skilled in the art will appreciate there can be various approaches for how the delay elements 300, 302 are tuned or set, i.e., to what values. Typically, it can be assumed the transmit direction 150 in the optical path 310 will have more delay than the received direction 152 in the optical path 310. So, in one embodiment, just the delay element 302 can be configured to add a delay equal to the difference between the delay in the transmit direction 150 and the delay in the receive direction 150. Of course, in another embodiment, both the delay elements 300, 302 can be used.

In another embodiment, the delay elements 300, 302 can be used as well to compensate for delay variations in the digital path 312. Of note, it is expected that the optical delay in the optical path 310 is usually stable, i.e., does not change for a given module 10. That is, different modules 10 may have different optical delays, but a given module's 10 optical delay generally is stable as it is a function of optical components. These optical components may age or exhibit different characteristics over time, but generally the delay will be stable. The digital path 312 may exhibit more variability such as due to FEC delay. Note, some modern FEC techniques use variability to achieve better performance, where the variability adds delay. Any in-service changes in the digital path 312 can be detected on an ongoing basis, with the delay elements 300, 302 tuned additionally to compensate for this delay.

FIG. 9 is a block diagram of a link formed between two optical modules 10A, 10B, each having the delay elements 300, 302 therein. The above embodiments addressed delay variation within a single module 10, i.e., the objective being for the delay elements 300, 302 to achieve about the same delay in the transmit direction 150 as in the receive direction 152. Of course, other embodiments are possible, such as compensating delay at a higher level, using a management system 350 or some coordination between the two network elements 200A, 200B operating the optical modules 10A, 10B to form a communication channel.

In an embodiment, instead of compensating within a module 10, it is possible to compensate across two modules 10A, 10B together, so that the transmit direction 150 and the receive direction 152 can have the same delay between the two modules 10A, 10B. This approach does not equalize the delay within the modules 10A, 10B themselves as above, but rather can equalize the delay between the network elements 200A, 200B. For example, the delay elements 300, 302 in each of the optical modules 10A, 10B can be configured so that the transmit direction 150 has the same delay as the receive direction 152, when measured at the network elements 200A, 200B.

Examples where this approach of tuning the added digital delay element(s) to match the delay on the paths in each direction between NEs instead of equalizing the delay contribution of the modules themselves could be used include: 1) cases where the aggregate line fiber assembly used in the two directions may be mismatched in length, and 2) cases of bidirectional fiber where the same line fiber is used for signals in both directions at different wavelengths, and thus the signals in each direction have different total propagation times through the fiber due to dispersion.

Here, there is a need to coordinate setting of the delay elements 300, 302. This can be done based on messaging between the network elements 200A, 200B, messaging with the management system 350, and the like. The messaging can be out-of-band or in-band, i.e., via a management channel, via an Optical Service Channel (OSC), via an overhead channel, etc. Those skilled in the art will recognize there can be various implementations for coordinating the settings including ones with the management system 350, as well as ones without a management system 350 where the modules 10A, 10B themselves coordinate.

In another embodiment, assume the optical module 10B does not support the delay elements 300, 302, but the optical module 10A does. There is an opportunity here for the optical module 10A to configure its delay elements 300, 302 to compensate not only for the delay variation of the optical module 10A, but to also compensate for the delay variation of the optical module 10B.

Of course, those skilled in the art will appreciate there can be various ways to ensure there is little to no CTE variation, within each optical module 10A, 10B, as well as in a communication channel formed by both of the optical modules 10A, 10B. All such embodiments are contemplated herewith.

Optical Module with Delay Elements

In an embodiment, an optical module 10 includes a transmitter assembly 12; a receiver assembly 14; and circuitry 16 connected to the transmitter assembly 12 and the receiver assembly 14, wherein the circuitry 16 includes one or more delay elements 300. 302 each configured to add a configured amount of delay in one or more of a transmit direction 150 and a receive direction 152 within the optical module 10. The transmit direction 150 is from a host device 20 through the circuitry 16 and the transmitter assembly 12, and wherein the receive direction 152 is to the host device 20 from the receiver assembly 14 and through the circuitry 16. The one or more delay elements 300, 302 are configured such that a delay in the transmit direction 150 approximately equals a delay in the receive direction 152.

In an embodiment, the one or more delay elements 300, 302 include a single delay element on the receive direction 152, and wherein the amount of the delay is based on a difference between a delay in the transmit direction 150 and the receive direction 152. There can be variable delay in the transmit direction 150 relative to the receive direction 152 based on one or more of (1) a different optical delay associated with each of the transmitter assembly 12 and the receiver assembly 14, and (2) digital delay in the circuitry 16 associated with each of the transmit direction 150 and the receive direction 152.

The one or more delay elements 300, 302 can include First-In-First-Out (FIFO) elements in the circuitry 16. The amount of delay can be based on a respective stored delay value for one or more of the transmitter assembly 12 and the receiver assembly 14. The stored delay value for one or more of the transmitter assembly 12 and the receiver assembly 14 can be responsive to a test of delay in one or more of the transmitter assembly 12 and the receiver assembly 14. The amount of delay can be based on a test of delay in each of the transmitter assembly 12 and the receiver assembly 14. The amount of delay can be based on one or more of (1) a test of delay in each of the transmitter assembly 12 and the receiver assembly 14, and (2) a determination of delay in the circuitry 16.

Process

FIG. 10 is a flowchart of a process 400 for optical delay compensation of optical modules. The process 400 contemplates operation with the modules 10, and the like. The process 400 includes operating an optical module that includes a transmitter assembly, a receiver assembly, and circuitry connected to the transmitter assembly and the receiver assembly (step 402); and configuring one or more delay elements in the circuitry to add a respective configured amount of delay in one or more of a transmit direction and a receive direction within the optical module (step 404). The transmit direction is from a host device through the circuitry and the transmitter assembly, and wherein the receive direction to the host device from the receiver assembly and through the circuitry.

The process 400 can include setting the one or more delay elements such that a delay in the transmit direction approximately equals a delay in the receive direction (step 406). The one or more delay elements can include a single delay element on the receive direction, and wherein the process 400 can further include setting the amount of the delay based on a difference between a delay in the transmit direction and the receive direction. There can be a variable delay in the transmit direction relative to the receive direction based on one or more of (1) a different optical delay associated with each of the transmitter assembly and the receiver assembly, and (2) digital delay in the circuitry associated with each of the transmit direction and the receive direction.

The one or more delay elements can include First-In-First-Out (FIFO) elements in the circuitry. The process 400 can include determining the amount of delay based on a respective stored delay value for one or more of the transmitter assembly and the receiver assembly. The respective stored delay value for one or more of the transmitter assembly and the receiver assembly can be responsive to a test of delay in one or more of the transmitter assembly and the receiver assembly. The amount of delay can be based on a test of delay in each of the transmitter assembly and the receiver assembly. The amount of delay can be based on one or more of (1) a test of delay in each of the transmitter assembly and the receiver assembly, and (2) a determination of delay in the circuitry.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. An optical module comprising:
a transmitter assembly;
a receiver assembly; and
circuitry connected to the transmitter assembly and the receiver assembly, wherein the circuitry includes one or more tunable delay elements each configured to add a respective configured amount of delay in one or more of a transmit direction and a receive direction within the optical module, and wherein the circuitry is configured to, responsive to a test of delay in each of the transmitter assembly and the receiver assembly, store respective delay values for the transmitter assembly and the receiver assembly and to set at least one of the tunable digital delay elements based on the stored respective delay values.

2. The optical module of claim 1, wherein the transmit direction is from a host device through the circuitry and the transmitter assembly, and wherein the receive direction is to the host device from the receiver assembly and through the circuitry.

3. The optical module of claim 1, wherein the one or more delay elements are configured such that a delay in the transmit direction approximately equals a delay in the receive direction.

4. The optical module of claim 1, wherein the one or more delay elements include a single delay element on the receive direction, and wherein the amount of the delay is based on a difference between a delay in the transmit direction and the receive direction.

5. The optical module of claim 1, wherein there is variable delay in the transmit direction relative to the receive direction based on one or more of (1) a different optical delay associated with each of the transmitter assembly and the receiver assembly, and (2) digital delay in the circuitry associated with each of the transmit direction and the receive direction.

6. The optical module of claim 1, wherein the one or more delay elements include First-In-First-Out (FIFO) elements in the circuitry.

7. The optical module of claim 1, wherein the amount of delay is based on a respective stored delay value for one or more of the transmitter assembly and the receiver assembly, the respective stored delay value being stored in non-volatile memory or registers of the circuitry and being provided responsive to a query of module delay.

8. The optical module of claim 7, wherein the respective stored delay value for one or more of the transmitter assembly and the receiver assembly is responsive to a test of delay in one or more of the transmitter assembly and the receiver assembly the test of delay comprising inserting a timing event by the circuitry and detecting the timing event at a corresponding receiver assembly.

9. The optical module of claim 1, wherein the amount of delay is based on a test of delay in each of the transmitter assembly and the receiver assembly, the test of delay being performed with the transmitter assembly optically coupled to the receiver assembly in a loopback configuration.

10. The optical module of claim 1, wherein the amount of delay is based on both (1) a test of delay in each of the transmitter assembly and the receiver assembly, and (2) a determination of digital delay in the circuitry.

11. A method comprising steps of:
operating an optical module that includes a transmitter assembly, a receiver assembly, and circuitry connected to the transmitter assembly and the receiver assembly;
performing a test of delay in each of the transmitter assembly and the receiver assembly, and storing respective delay values for the transmitter assembly and the receiver assembly; and
configuring one or more tunable delay elements in the circuitry to set at least one of the tunable digital delay elements based on the stored respective delay values.

12. The method of claim 11, wherein the transmit direction is from a host device through the circuitry and the transmitter assembly, and wherein the receive direction is to the host device from the receiver assembly and through the circuitry.

13. The method of claim 11, wherein the steps further include
setting the one or more delay elements such that a delay in the transmit direction approximately equals a delay in the receive direction.

14. The method of claim 11, wherein the one or more delay elements include a single delay element on the receive direction, and wherein the steps further include setting the amount of the delay based on a difference between a delay in the transmit direction and the receive direction.

15. The method of claim 11, wherein there is variable delay in the transmit direction relative to the receive direction based on one or more of (1) a different optical delay associated with each of the transmitter assembly and the receiver assembly, and (2) digital delay in the circuitry associated with each of the transmit direction and the receive direction.

16. The method of claim 11, wherein the one or more delay elements include First-In-First-Out (FIFO) elements in the circuitry.

17. The method of claim 11, wherein the steps further include
determining the amount of delay based on a respective stored delay value for one or more of the transmitter assembly and the receiver assembly, the respective stored delay value being stored in non-volatile memory or registers of the circuitry and being provided responsive to a query of module delay.

18. The method of claim 17, wherein the respective stored delay value for one or more of the transmitter assembly and the receiver assembly is responsive to a test of delay in one or more of the transmitter assembly and the receiver assembly, the test of delay comprising inserting a timing event by the circuitry and detecting the timing event at a corresponding receiver assembly.

19. The method of claim 11, wherein the amount of delay is based on a test of delay in each of the transmitter assembly and the receiver assembly, the test of delay being performed with the transmitter assembly optically coupled to the receiver assembly in a loopback configuration.

20. The method of claim 11, wherein the amount of delay is based on both (1) a test of delay in each of the transmitter assembly and the receiver assembly, and (2) a determination of digital delay in the circuitry.

* * * * *